United States Patent [19]
Delisle et al.

[11] 3,941,652
[45] Mar. 2, 1976

[54] FAILED FUEL DETECTION FOR NUCLEAR REACTOR

[75] Inventors: Jean-Paul Delisle, Manosque; Raymond Pochard, Versailles; Robert Porte, Le-Mesnil-St.-Denis; Lucien Prouteau, Maurepas, all of France

[73] Assignee: Commissariat a l'Energie Atomique, Paris, France

[22] Filed: Sept. 15, 1971

[21] Appl. No.: 180,715

[30] Foreign Application Priority Data
Sept. 22, 1970 France.............................. 70.34314

[52] U.S. Cl. ........................................... 176/19 LD
[51] Int. Cl.² ........................................ G21C 17/04
[58] Field of Search .................. 176/19 LD, 19 R

[56] References Cited
UNITED STATES PATENTS
3,234,101  2/1966  Berthod ........................... 176/19 LD
3,612,860  10/1971  Hackney .......................... 176/19 LD FOREIGN PATENTS OR APPLICATIONS
1,201,552  7/1959  France ............................ 176/19 LD Primary Examiner—Stephen C. Bentley
Attorney, Agent, or Firm—Lane, Aitken, Dunner & Ziems

[57] ABSTRACT

For location of failed fuel cans in a sodium-cooled nuclear reactor, a gas flow under a pressure slightly higher than that of the sodium at the outlet of the fuel assemblies is supplied to the outlets of each of the assemblies in seriatim order. The resulting emulsion is raised by air-lift and collected in a tank located at a level higher than that of the outlet. The gas separates from the emulsion and a gas output from the tank is monitored to detect the presence of radioactive products therein.

7 Claims, 3 Drawing Figures

3,941,652

FAILED FUEL DETECTION FOR NUCLEAR REACTOR

BACKGROUND OF THE INVENTION

The invention relates to failed fuel detection and more particularly a apparatus for detecting and locating failures of the fuel cans of liquid-cooled nuclear reactors, for example nuclear reactors cooled by an upward flow of molten sodium.

Since fuel failures allow fission products to escape into the coolant, they must be detected and located as quickly as possible. In liquid-cooled reactors having no pressure tubes, such determination of the location of fuel failures is complicated by the mixing of the liquid coming from the various fuel sub-assemblies at their outlets. One solution for this kind of reactor is to take at the outlet of each fuel sub-assembly a small portion of the liquid flow which has passed therethrough, mix the sample with a gas having a large neutron capture cross-section, separate the gas and monitor it. Since the gas becomes radioactive in contact with the contaminated liquid, a sub-assembly having a failed fuel is shown up by the activity of the gas coming from the corresponding sample. A single mechanicaly sampling pump might be used (or if the liquid is conductive an electro-magnetic pump) with a selector valve which connects the inlet of the pump to the outlets of all the sub-assemblies in the core in succession. This method has serious drawbacks, since it is difficult to design and manufacture a liquid sample selector valve which correctly operates in the conditions to which it is subjected for long periods of time.

Moreover, if the pump is mechanical its moving parts are fragile.

SUMMARY OF THE INVENTION

The invention is intended to obviate such disadvantages.

The invention also relates to an apparatus for locating fuel can failures in nuclear reactors cooled by an upward flow of a liquid coolant, the apparatus comprising a source providing a gas at a pressure slightly higher than the pressure of the liquid at the outlet of nuclear fuel assemblies to be monitored in the reactor, emulsifiers each associated with an assembly and disposed thereabove, a selector means for supplying gas to each of the emulsifiers successively from the source, collecting means connected to all said emulsifiers and in which the gas separates from the liquid coolant, and gas-analysing means connected to the collecting means.

A single analysing installation and a single selector valve can be used to monitor all the assemblies of a reactor, or alternatively a number of independent systems can be provided each of which is associated with some of the assemblies.

It can be seen that the invention obviates the disadvantages of the apparatus described hereinbefore. The extreme simplicity of construction of the emulsifying device enables one to be used for each assembly, thus obviating any distributor in the liquid circuit (the distributor incorporated in the circuit of gas inactive at ambient temperature operates under much less severe conditions, is much less susceptible to breakdown and is as a rule placed outside the reactor enclosure). The gas is intimately mixed with the liquid during the expansion producing pumping, so that the analysing installation can be less sensitive and therefore less expensive.

An embodiment of the invention will now be described by way of example with reference to the accompanying drawings, wherein.

Figure 1:
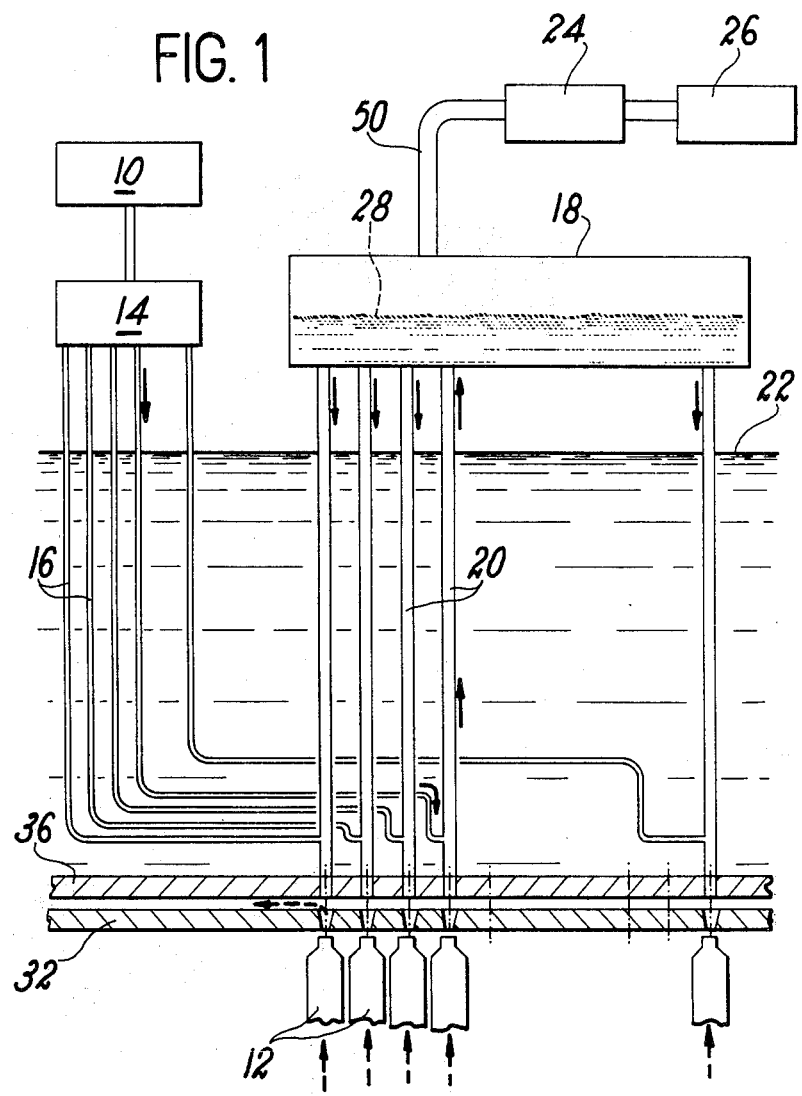
FIG. 1 is a simplified basic diagram of the apparatus for localising ruptures in cans of fast neutron reactors cooled by liquid sodium circulation (only a section of the assemblies is shown)

The localising apparatus diagrammatically illustrated in FIG. 1 comprises a source 10 of gas (for instance, argon) at a pressure $P_1$ slightly higher than the pressure $P_2$ of the coolant (liquid sodium) at the outlet of assemblies 12. A distributor 14 enables any of tubes 16, each connected to an emulsion pump associated with one of the assemblies 12, to be connected to the source 10. Clearly, the term "assembly" covers both a group of fuel pencils in the same envelope, and a single fuel element.

Figure 3:
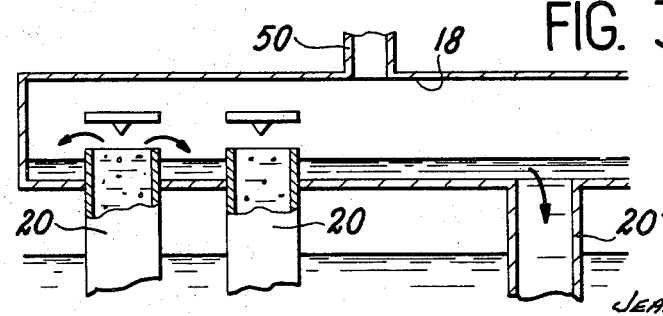

The emulsion coming from that pump which is supplied with gas rises into a collecting and degasifying tank 18 via a vertical tube 20 (one tube 20 is provided for each assembly 12). The level of the tank 18 above the free surface 22 of the sodium is such that a separation is established therein between the liquid sodium, which returns to the mass of sodium in the core via the tubes 20 to which emulsion is not supplied, and the gas. The return of the sodium from the degasifying tank via the tubes 20 not supplied with emulsion might have the disadvantage of polluting such tubes with sodium charged with fission products by their passage through the tube corresponding to the faulty assembly, so that the signal might be slightly difficult to detect. One possible solution to this is illustrated in FIG. 3, which shows how the sodium is returned from the degasifying tank 18 to the reactor via a special tube 20' provided for this purpose and disposed at a lower level than the other tubes. The gas is sucked in by a pump 24 which sends it to an analysing installation 26. For the sake of clarity, FIG. 1 shows in solid arrows the flow paths followed by the gas, the emulsion and the coolant on its way back from the tank 18, broken arrows showing the normal flow of the sodium coolant.

The emulsion pump operates on the following principle: the gas injected at the base of a vertical tube 20 at pressure $P_1$ produces an emulsion whose mean density is lower than that of the liquid coolant. The emulsion rises in the tube 20 and reaches a level higher than that of the surface. The gas flow required for pump operation being low in relation to the total liquid flow for each assembly, supply tubes 16 of small section are enough. Clearly, the volume of the tank 18 is selected to keep the time required for checking an assembly within reasonable limits. The degasifying tank can have a volume of the order of 30 liters for an analysing installation 26 adapted to deliver a signal when it receives a total flow of the order of 0.1 – 0.2 liters per second coming from an assembly 12.

Figure 2:
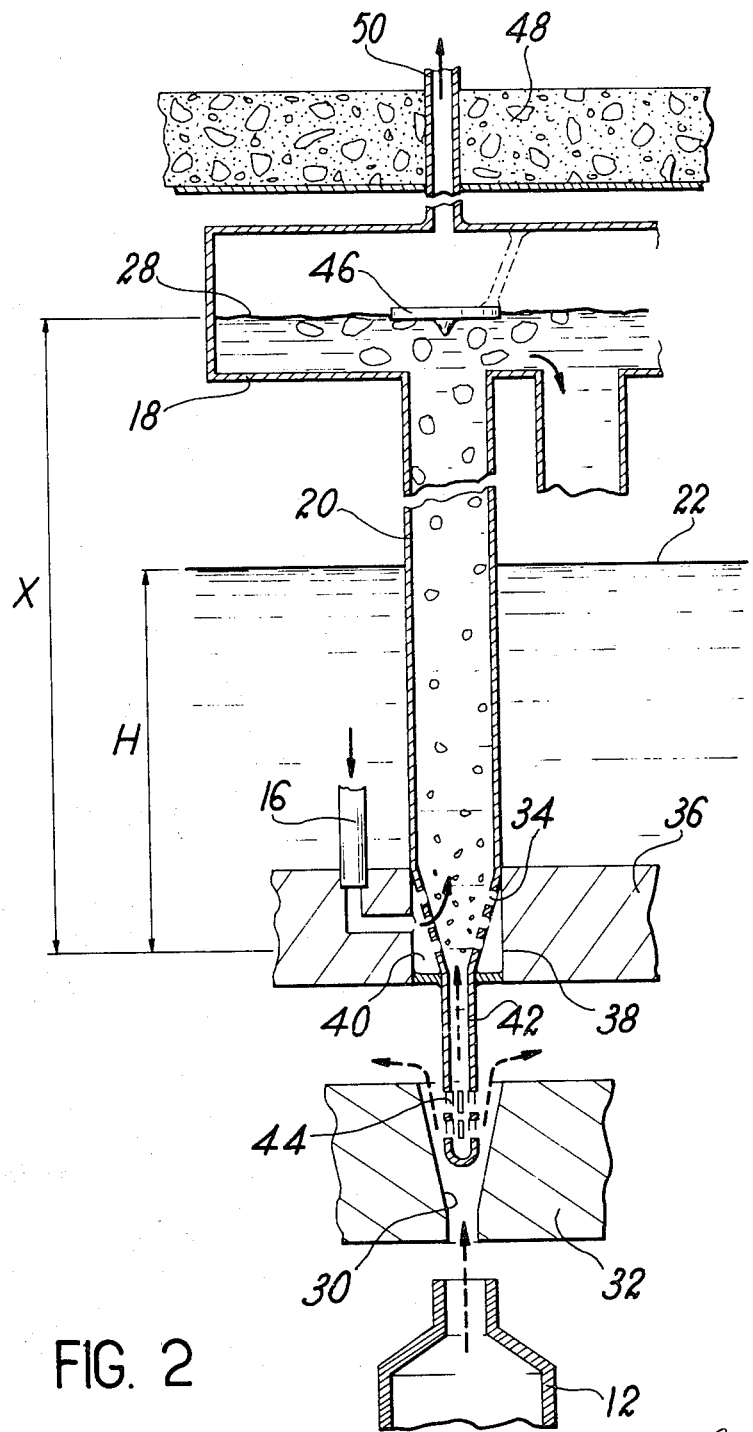
FIG. 2 shows diagrammatically, sectioned along a vertical plane, a portion of the installation associated with each assembly, and FIG. 3 diagrammatically illustrates a variant embodiment.

FIG. 2 shows an emulsion pump which can be used in the installation illustrated in FIG. 1, in which the pump is associated with an assembly 12. The outlet of the assembly 12 is placed in line with an upwardly flared passage 30 of generally frusto-conical shape with which the core cover plate 32 is formed. The pump diffusor is formed by a perforate cone 34 inserted in a bore 38 in a plate 36 which on the one hand acts as a support for the tubes 20 and on the other co-operates with the cones 34 to bound gas distribution chambers 40 into which the tubes 16 discharge.

An identical sodium flow does not pass through all the assemblies 12 of a nuclear reactor, since the dynamic pressures diminish from the centre to the periphery by a factor often of the order of 2. To allow for this, the cone 34 is continued by a bottom tip 42 whose end is obturated and whose side wall is formed with slots or apertures 44 of a size adequate to prevent them being clogged by impurities.

By this method the liquid admitted to the cone 34 will be at the same pressure in all tubes, such pressure being the height of the sodium in the reactor vessel and therefore all the emulsion pumps will be identical for any given reactor.

Clearly, the tips 42 must penetrate into the passages 30 deeply enough for each diffuser to collect only sodium coming from the assembly 12 to be checked. The flared shape of the passages 30 compensates for the reduction in section due to the introduction of the tip 42 and prevents any increase in speed which might result from such reduction.

Disposed in the tank 18 of flat shape, opposite each tube 20 and at a level 28, are anti-splash plates 46 (FIG. 2) adapted to encourage the separation of the gas from the liquid and limit its level locally. The gas pump 24 and the analysing installation 26 disposed outside the reactor screening enclosure 48 are connected to the tank via a conduit 50.

The following numerical data, given by way of example, are those of an apparatus adapted for use with a fast neutron 250 MWe reactor in which the outlet temperature of the assemblies under normal operating conditions is 833°K:

| | |
|---|---|
| Inside diameter of tube 20: | 25 mm |
| Inside diameter of tip 42: | 16 mm |
| Pressure $P_1$ of the gas in the emulsifier: | 1.175 bar |
| sodium flow in the pump: | 0.28 l/s |
| Gas flow in the emulsifier at pressure $P_1$ and normal operating temperature: | 0.45 l/s |
| Gas flow at outlet of tube 20: | 0.53 l/s |
| Speed of the emulsion in center of tube 20: | 2 m/s |
| proportion of gas by volume at the center of the tube 20: | 0.5 |
| Delivery of the pump: | 0.45 |
| Emersion ratio: | x/H = 1.8 |

Clearly, the emersion ratio must be so selected that the level of the emulsion does not drop below the tank 18. The value of 1.8 shown above takes account of this fact, whose importance is clear if it is remembered that for this particular reactor the outlet temperature of the assemblies on stoppage (corresponding to minimum level 28) is 453°K, while such temperature is 833°K during operation.

The main advantages afforded by the invention can be gathered from the foregoing description: the apparatus is very simply constructed and there is very little risk of breakdown (pumps without moving members, switching distributor disposed in the gas circuit); sensitivity is increased by the intimate mixing of the gas and liquid during the formation of the emulsion.

The use of pumps with tips enables standard diffusers to be used throughout the installation.

We claim:

1. Apparatus for locating failed fuel assemblies in a nuclear reactor cooled by upward flow of liquid coolant through the fuel assemblies, comprising gas source means for supplying gas at a pressure greater than the pressure of liquid coolant at the outlet of each assembly, emulsion producing means for producing an emulsion between the gas and the liquid coolant, the emulsion producing means including an enclosed flow path for each assembly adapted to receive a portion of the liquid coolant flowing from the outlet thereof, the emulsion producing means further including gas diffusion means connected to the flow path and adapted to receive gas from the gas source means and introduce the gas into liquid coolant flowing through the flow path, selector means for successively supplying gas to each gas diffusion means one at a time, means for separating the gas from the liquid coolant, and means for detecting the presence of radioactivity in the separated gas, each flow path including a tube with one end near the outlet of a fuel assembly, said tube being adapted to enable the liquid coolant to flow upwardly therein, the gas diffusion means including a gas chamber bounded on one side by said tube and on the other side by a supporting plate connected to the selector means, the portion of the tube that bounds the gas chamber being laterally disposed and including a plurality of gas inlet apertures therein.

2. An apparatus as set forth in claim 1, wherein said laterally disposed portion of the tube is frusto-conical and co-operates with a bore in the supporting plate to bound the gas chamber.

3. An apparatus as set forth in claim 2, wherein the tube is formed below the apertures with a tip which is of smaller diameter than that through which the emulsion flows and is formed with inlet slots or apertures for coolant coming from the fuel assembly.

4. An apparatus as set forth in claim 3, wherein each said tip projects into an upwardly flared passage of a plate disposed above the assemblies.

5. An apparatus as set forth in claim 1, wherein said means for separating is a shallow tank and disposed at a level such that the emulsion has a free surface in the tank.

6. An apparatus as set forth in claim 5, wherein anti-splash plates are disposed in the tank and each confronts one of the vertical tubes.

7. An apparatus as set forth in claim 1, wherein the means for separating is connected via a single outlet to said means for detecting and said later-named means is disposed outside the reactor shield.

* * * * *